(12) United States Patent
Smith (10) Patent No.: US 12,344,298 B2
(45) Date of Patent: Jul. 1, 2025

(54) FOLDABLE TRANSPORT CART FOR PLANAR MATERIALS

(71) Applicant: Clyde Smith, Deer Park, TX (US)

(72) Inventor: Clyde Smith, Deer Park, TX (US)

( * ) Notice: Subject to any disclaimer, the term of this patent is extended or adjusted under 35 U.S.C. 154(b) by 614 days.

(21) Appl. No.: 17/853,725

(22) Filed: Jun. 29, 2022

(65) Prior Publication Data

US 2024/0001978 A1 Jan. 4, 2024

(51) Int. Cl.
*B62B 3/02* (2006.01)
*B62B 3/10* (2006.01)

(52) U.S. Cl.
CPC ............... *B62B 3/02* (2013.01); *B62B 3/108* (2013.01)

(58) Field of Classification Search
CPC .................................... B62B 3/02; B62B 3/108
See application file for complete search history.

(56) References Cited

U.S. PATENT DOCUMENTS

| | | | |
|---|---|---|---|
| 2,466,149 A | 4/1949 | Burg | |
| 2,514,308 A * | 7/1950 | Burg | B62B 3/02 280/47.18 |
| 3,729,209 A * | 4/1973 | Litz | B62B 3/02 280/651 |
| 3,841,651 A | 10/1974 | Bigney | |
| 4,194,591 A * | 3/1980 | Fisher | E04G 1/34 182/127 |
| 4,630,838 A | 12/1986 | Stockton | |
| 5,037,117 A * | 8/1991 | Hershberger | B62B 3/108 280/35 |
| 5,441,379 A | 8/1995 | Gilbert, Jr. | |
| 5,820,145 A | 10/1998 | Osowski | |
| 6,419,245 B1 * | 7/2002 | Trimble | B62B 3/10 175/162 |
| 8,348,287 B1 * | 1/2013 | Smith | B62B 3/108 280/47.35 |
| 8,641,061 B1 | 2/2014 | Sims | |
| D764,138 S | 8/2016 | Del Rosario | |
| 10,471,980 B1 * | 11/2019 | Jordan | B62B 3/16 |
| 11,034,372 B1 * | 6/2021 | Jordan | B62B 5/0003 |
| 12,275,447 B1 * | 4/2025 | Machado | B62B 5/064 |
| 2006/0091096 A1 * | 5/2006 | Velez | B62B 3/102 211/60.1 |

(Continued)

FOREIGN PATENT DOCUMENTS

WO  WO9813248  4/1998

*Primary Examiner* — Erez Gurari (57) ABSTRACT

A foldable transport cart for planar materials for transporting planar materials includes material support frame pivotably coupled to a central frame, wherein the material support frame is configured to lock into each of a plurality of orientations including a vertical orientation and a horizontal orientation. The material support frame has a support surface configured to support a planar material when the material support frame is in the horizontal position and a pair of stop plates configured to support the planar material when the material support frame is in the vertical position. Each of a pair of caster frames is pivotably coupled to the bottom of the central frame and are moveable between a deployed position and a folded position. A collapsed configuration which facilitates storage results when the material support frame is vertically oriented and each of the pair of caster frames is in its folded position.

15 Claims, 5 Drawing Sheets

(56) References Cited

U.S. PATENT DOCUMENTS

| | | | |
|---|---|---|---|
| 2015/0259003 A1* | 9/2015 | Septimio | B62B 3/06 |
| | | | 280/47.18 |
| 2017/0029250 A1* | 2/2017 | Thomsen | B08B 1/143 |
| 2017/0361858 A1* | 12/2017 | Gorman | B62B 3/108 |
| 2021/0278752 A1* | 9/2021 | Christensen | G03B 17/561 |
| 2024/0001978 A1* | 1/2024 | Smith | B62B 3/02 |
| 2024/0199106 A1* | 6/2024 | Hayward | B62B 5/04 |
| 2024/0208256 A1* | 6/2024 | Robinson | B65H 23/08 |
| 2024/0326887 A1* | 10/2024 | Browne | B62B 3/108 |

\* cited by examiner

FOLDABLE TRANSPORT CART FOR PLANAR MATERIALS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transport carts and more particularly pertains to a new transport cart for transporting planar materials.

(2) Description of Related Art Including Information Disclosed Under 37 CFR 1.97 and 1.98

The prior art relates to transport carts which resort to various means for supporting planar materials. Several of the devices in the prior art disclose a geometry which is thin along one horizontal dimension and which transports the planar materials by positioning them substantially vertically. This is a limiting geometry that does not allow for flexibility in the positioning of the planar materials, which facilitates loading and unloading the material from and to a variety of spaces. At least one prior art device is made to adapt to different angles of the planar materials, but it utilizes bulky geometry that cannot collapse for convenient storage. It also uses hydraulics to aid in the positioning of the planar materials, which can be unnecessarily expensive and introduce complexity which creates a heightened need for maintenance and repairs.

Another device collapses for convenient storage but lacks a mechanism for holding the planar materials at various angles. This collapsing device also collapses into a low horizontal planar space, which causes increased difficulty in storing due to the added requirement of reaching low to the ground to pick up the device and move it to a convenient storage location without the aid of wheels. The prior art does not disclose a wheeled transport cart for planar materials which can angle the planar materials in a variety of orientations, balances the planar materials on a central support to eliminate the need for hydraulics or similar weight-bearing mechanisms, and collapses into a vertical planar space that can be pushed on its wheels into a thin storage space.

BRIEF SUMMARY OF THE INVENTION

An embodiment of the disclosure meets the needs presented above by generally comprising material support frame pivotably coupled to a central frame, wherein the material support frame is configured to lock into each of a plurality of orientations including a vertical orientation and a horizontal orientation. The material support frame has a support surface configured to support a planar material when the material support frame is in the horizontal position and a pair of stop plates configured to support the planar material when the material support frame is in the vertical position. Each of a pair of caster frames is pivotably coupled to the bottom of the central frame and are moveable between a deployed position and a folded position. A collapsed configuration which facilitates storage results when the material support frame is vertically oriented and each of the pair of caster frames is in its folded position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
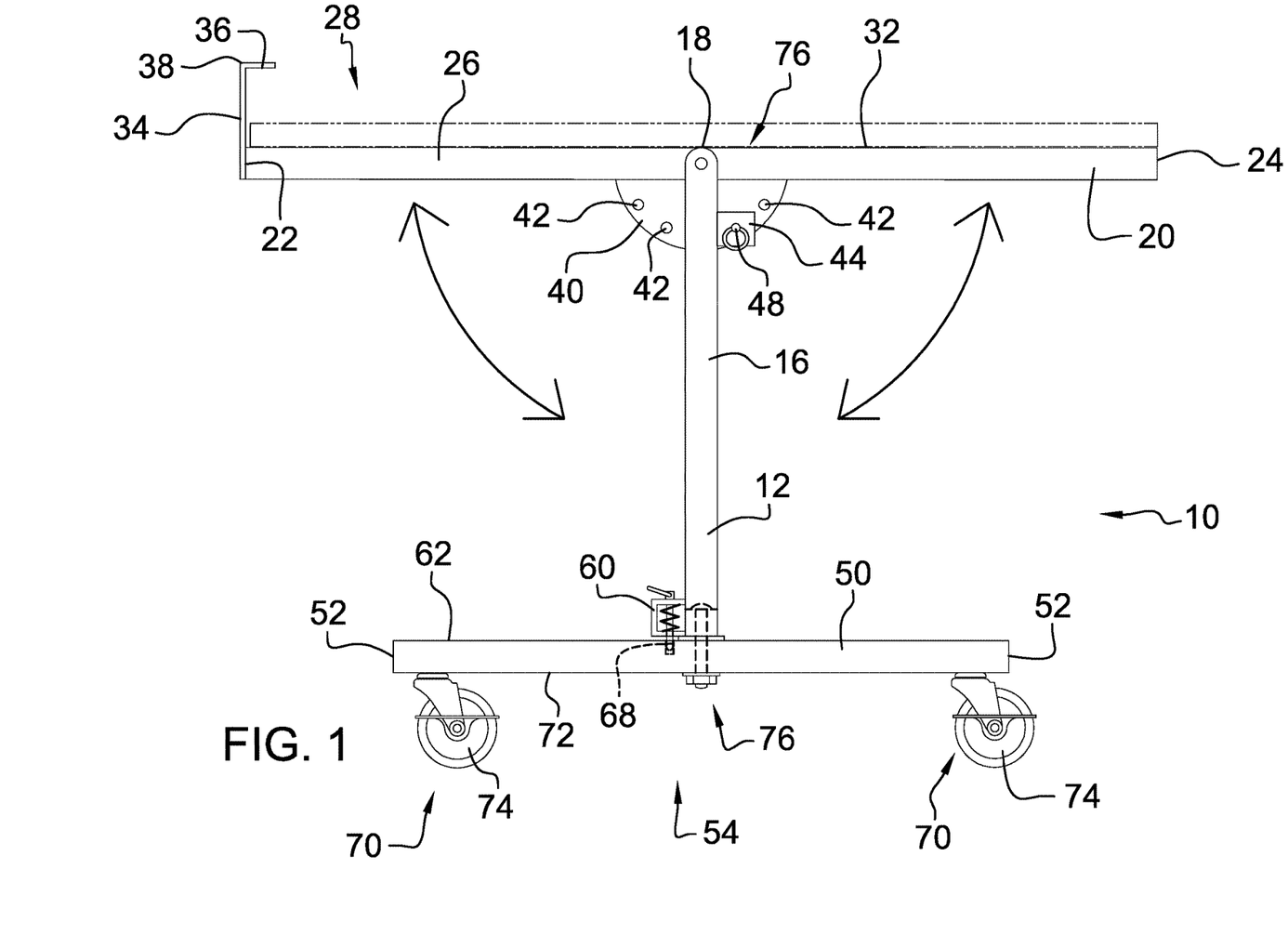
FIG. 1 is a front in-use view of a foldable transport cart for planar materials according to an embodiment of the disclosure.
Figure 2:
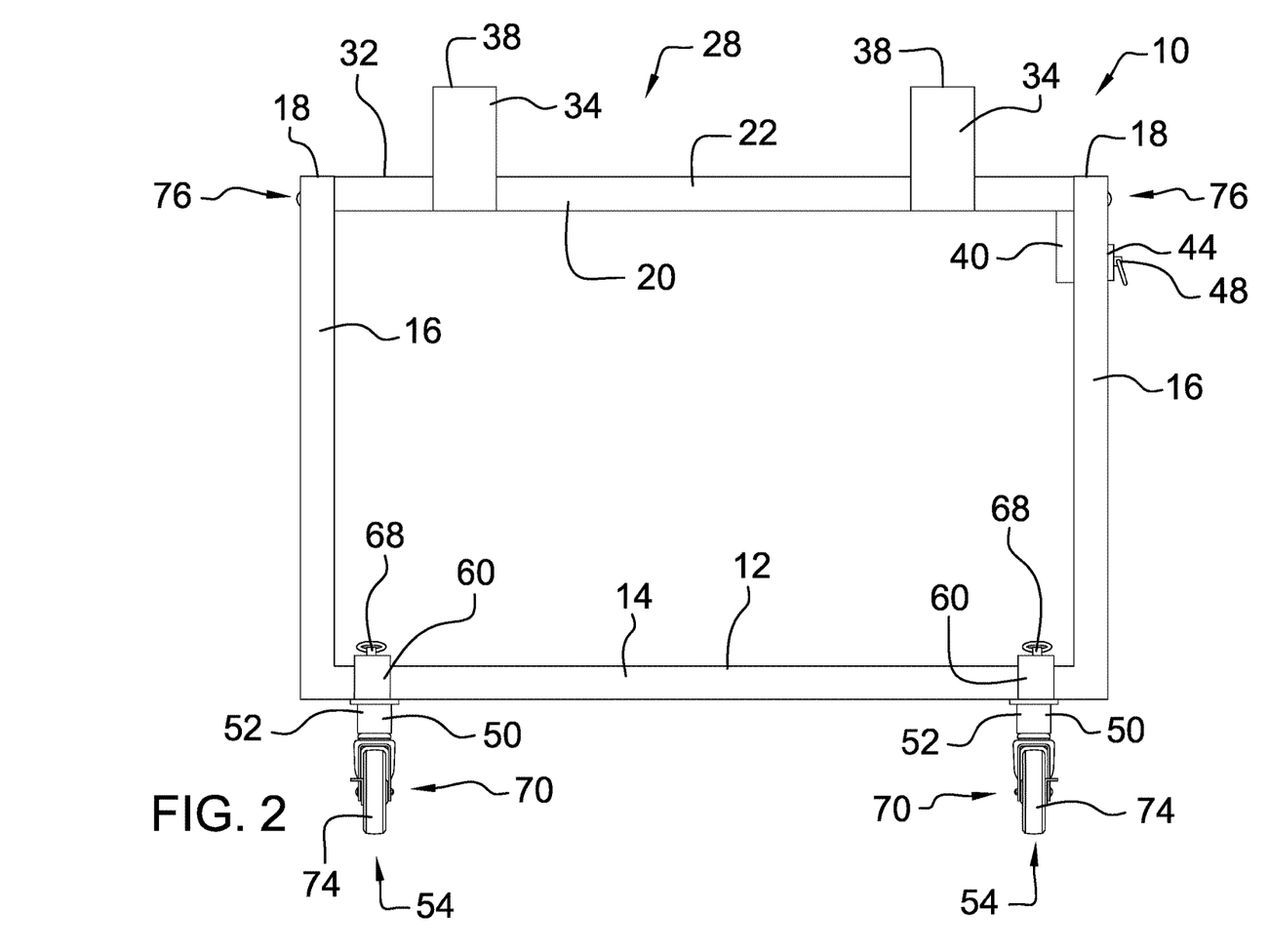
FIG. 2 is a left side view of an embodiment of the disclosure.
Figure 3:
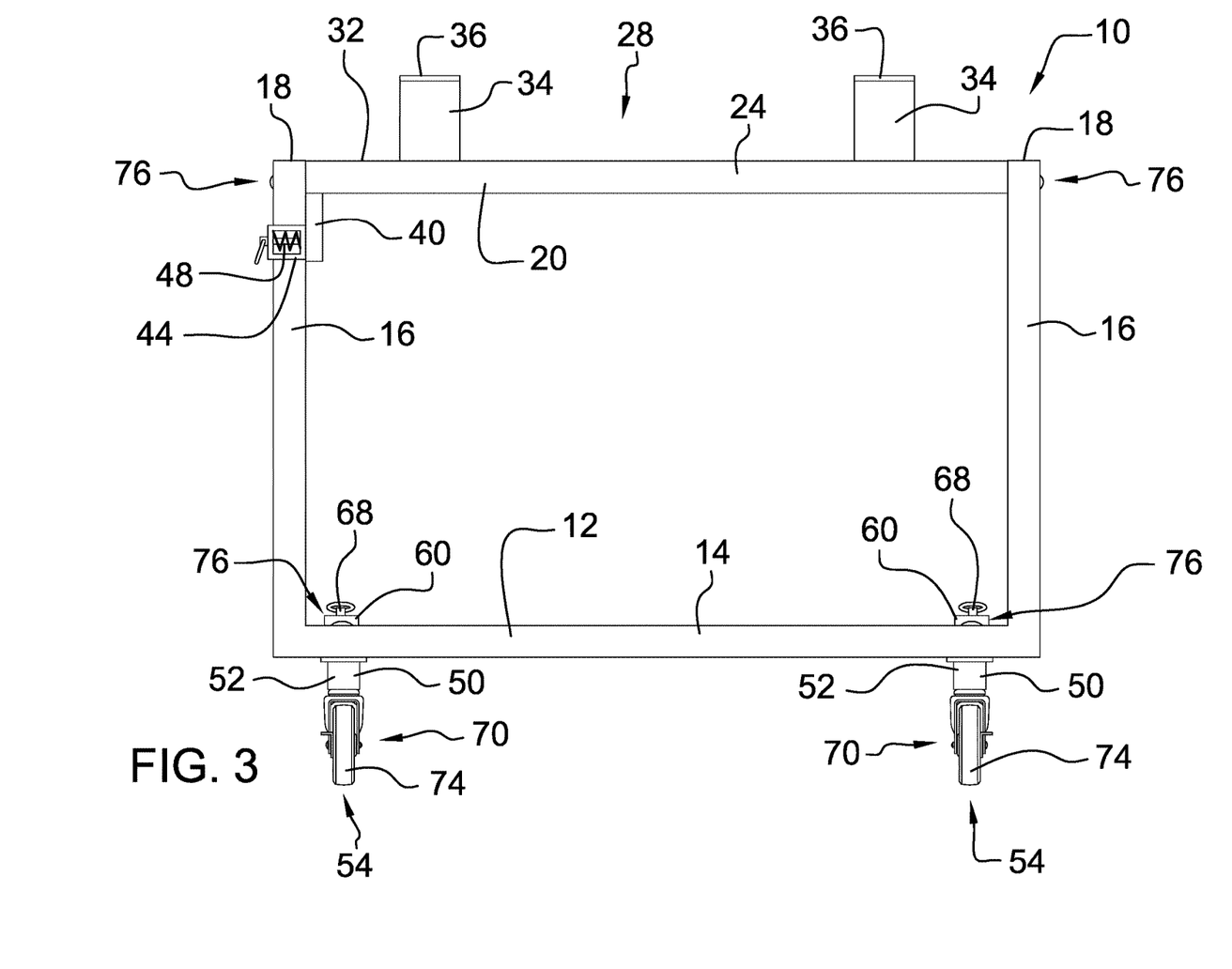
FIG. 3 is a right side view of an embodiment of the disclosure.
Figure 4:
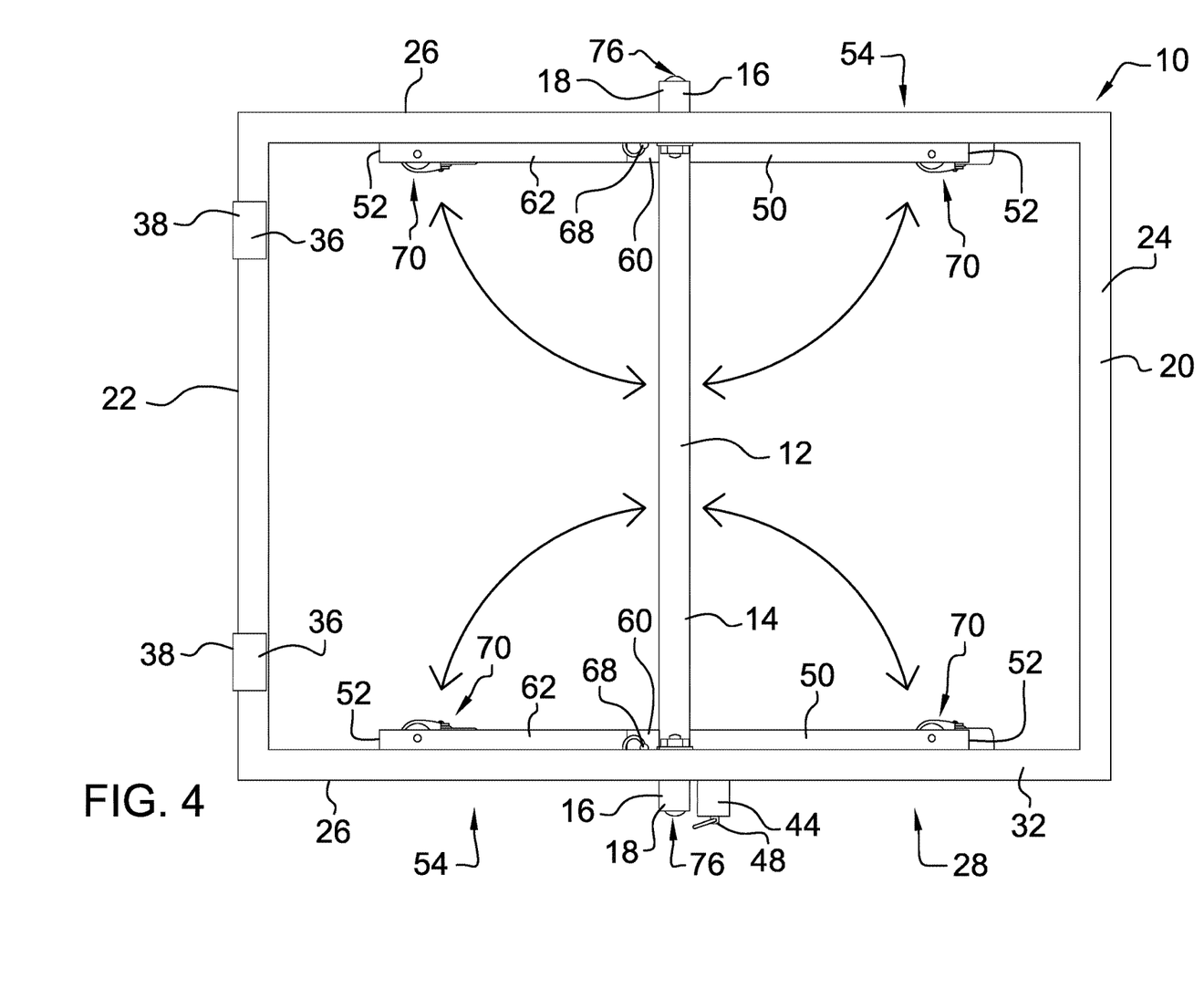
FIG. 4 is a top view of an embodiment of the disclosure.
Figure 5:
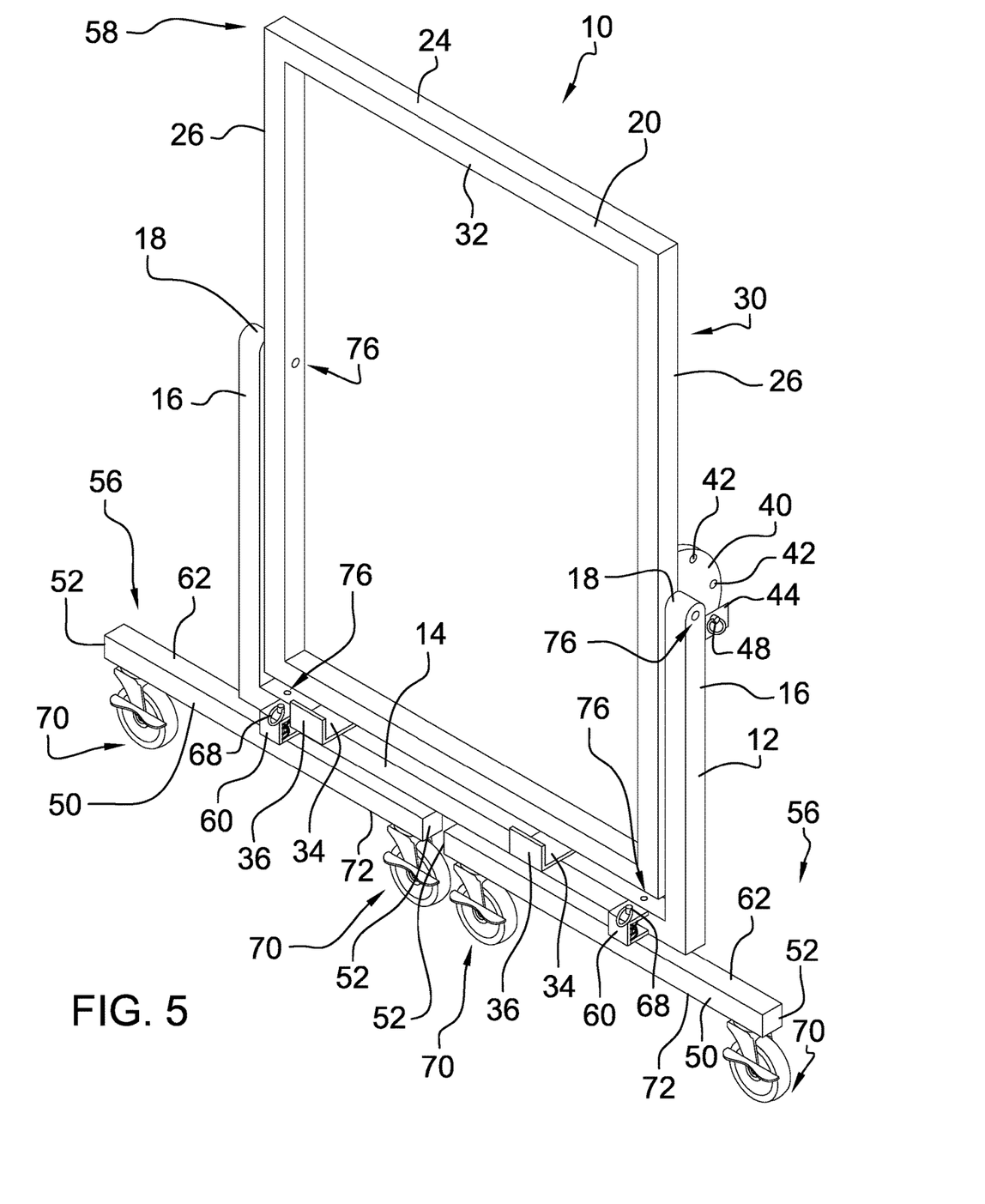
FIG. 5 is a top front side perspective view of an embodiment of the disclosure.

With reference now to the drawings, and in particular to FIGS. 1 through 5 thereof, a new transport cart embodying the principles and concepts of an embodiment of the disclosure and generally designated by the reference numeral 10 will be described.

As best illustrated in FIGS. 1 through 5, the foldable transport cart for planar materials 10 generally comprises a central frame 12 comprising a horizontal member 14 extending between a pair of vertical members 16, wherein each vertical member 16 extending upward from the horizontal member 14. The horizontal member 14 of the central frame 12 is elongated and constructed of 5.08-centimeter square tubing extending between each vertical member 16 of the central frame 12, and each vertical member 16 of the central frame 12 is constructed of 5.08-centimeter square tubing extending from the horizontal member of the central frame 12 to an associated distal end 18 of each vertical member 16 relative to the horizontal member 14.

A material support frame 20, which is rectangular, extends from a first end 22 of the material support frame 20 to a second end 24 of the material support frame 20. The material support frame 20 has a pair of lateral sides 26 also extending from the first end 22 to the second end 24. Each lateral side 26 of the material support frame 20 is pivotably coupled to an associated vertical member 16 proximate a distal end 18 of the associated vertical member 16 relative to the horizontal member 14. The material support frame 20 is pivotable about a horizontal adjustment axis between a horizontal orientation 28 and a vertical orientation 30 and has a support surface 32 extending from the first end 22 of the material support frame 20 to the second end 24 of the material support frame 20 configured for supporting a surface of a planar material. The material support frame 20 is constructed of 5.08-centimeter square tubing extending along each of the first end 22 of the material support frame 20, the second end 24 of the material support frame 20, and each of the lateral sides 26 of the material support frame 20.

Alternatively, the central frame 12 may have a single vertical member 16 to which the material support frame 20 is pivotably coupled.

Each of a pair of stop plates 34 is coupled to the first end 22 of the material support frame 20 and extending away from the support surface 32 of the material support frame 20. Each stop plate 34 is positioned proximate an associated lateral side 26 of the material support frame 20. Each of a pair of stop plate lips 36 extends from a distal end 38 of an associated one of the stop plates 34 relative to the material support frame 20 parallel to the support surface 32 of the material support frame 20 and toward the second end 24 of the material support frame 20. Each stop plate lip 36 is configured for supporting an end of the planar material. The horizontal adjustment axis extends through a center of gravity of the material support frame 20, the pair of stop plates 34, and the pair of stop plate lips 36.

An orientation locking member 40 is coupled to the material support frame 20 opposite the support surface 32 of the material support frame 20. The orientation locking member 40 has a plurality of orientation holes 42 for locking the material support frame 20 in each of a plurality of orientations. The plurality of orientations includes the vertical orientation 30 and the horizontal orientation 28. An orientation bracket 44 is coupled to the vertical member 16 of the central frame 12, and a hole of the orientation bracket 44 is positioned such that each orientation hole 42 of the orientation locking member 40 is positionable coaxially with the hole of the orientation bracket 44. An orientation locking pin 48 is removably insertable concurrently through the hole of the orientation bracket 44 and each of the orientation holes 42 of the orientation locking member 40 such that the material support frame 20 is secured in an associated orientation. The orientation locking pin 48 is mechanically coupled to the orientation bracket 44 and is spring biased to insert through the hole of the orientation bracket 44.

Each of a pair of caster frames 50 is elongate, is constructed of 5.08-centimeter square tubing extending between each of a pair of ends 52 of the caster frame 50 and is pivotably coupled to a bottom surface of the horizontal member 14 of the central frame 12 proximate an associated end of a pair of ends of the horizontal member 14. Each caster frame 50 is pivotable about an associated vertical caster frame axis of a pair of vertical caster frame axes such that each caster frame 50 is pivotable between a deployed position 54 and a folded position 56. The horizontal member 14 of the central frame 12 has a central longitudinal axis of the horizontal member 14. A central longitudinal axis of each caster frame 50 is perpendicular to a vertical plane through the central longitudinal axis of the horizontal member 14 when the caster frame 50 is in the deployed position 54. Each central longitudinal axis of each caster frame 50 is parallel to the central longitudinal axis of the horizontal member 14 when the caster frame 50 is in the folded position 56. A collapsed configuration 58 results when the material support frame 20 is in the vertical orientation 30 and each caster frame 50 is in the folded position 56.

Each of a pair of deployment brackets 60 is coupled to the horizontal member 14 of the central frame 12, and each caster frame 50 has a hole in a top surface 62 of the caster frame 50 which is positionable coaxially with a hole of an associated deployment bracket 60. Each of a pair of deployment locking pins 68 is removably insertable concurrently through each hole of each deployment bracket 60 and the associated hole of the associated caster frame 50 such that the associated caster frame 50 is secured in the deployed position 54. Each deployment locking pin 68 is mechanically coupled to the associated deployment bracket 60 and is spring biased to insert through the associated hole of the associated caster frame 50.

An associated pair of a plurality of casters 70 is pivotably coupled to a bottom surface 72 of each caster frame 50 such that each caster 70 is positioned proximate an associated end 52 of the associated caster frame 50. Each caster 70 is pivotable about an associated vertical caster axis which is perpendicular to the central longitudinal axis of the associated caster frame 50. The plurality of casters 70 is configured for movably positioning the central frame 12 on a transport surface. Each caster 70 comprises a 10.16-centimeter caster wheel 74, which is constructed of rubber and lockable to the associated caster 70.

A first pair of a plurality of carriage bolt assemblies 76, pivotably couples the material support frame 20 to each vertical member 16 of the central frame 12. A second pair of carriage bolt assemblies 76 of the plurality of carriage bolt assemblies 76 pivotably couples the horizontal member 14 of the central frame 12 to each caster frame 50. Each carriage bolt assembly 76 comprises an associated carriage bolt, an associated spacer, an associated washer, and an associated lock nut.

In use, the material support frame 20 is locked in the horizontal orientation 28 and each caster frame 50 is locked in the deployed position 54. The surface of the planar material is placed on the support surface 32 of the material support frame 20. Then the foldable transport cart for planar materials 10 is moved across the transport surface to a destination, where the planar material is removed from the support surface 32 of the material support frame 20.

Alternatively, the material support frame 20 can be locked in the vertical orientation 30, wherein the pair of stop plates 34 support the planar material on the end of the planar material, if the vertical orientation 30 is more advantageous for use. Or the material support frame 20 can be locked in another orientation of the plurality of orientations such that the support surface 32 of the material support frame 20 and the pair of stop plates 34 cooperatively support the planar material. Or the material support frame 20 can be moved from one of the plurality of orientations to another one of the plurality of orientations during use.

Following use, the foldable transport cart for planar materials 10 is placed into the collapsed configuration 58, which facilitates storage of the transport cart for planar materials in a thin horizontal space relative to the horizontal area of the transport cart when each caster frame 50 is in the deployed position 54 and the material support frame 20 is in an orientation other than the vertical orientation 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable transport cart for planar materials comprising:
   a central frame, said central frame comprising a horizontal member and a vertical member coupled to and extending upward from said horizontal member, said horizontal member of said central frame being elongated along a central longitudinal axis of said horizontal member;
   a material support frame, said material support frame being rectangular, said material support frame extending from a first end of said material support frame to a second end of said material support frame, said material support frame being pivotably coupled to said vertical member of said central frame, said material support frame being pivotable about a horizontal adjustment axis between a horizontal orientation and a vertical orientation, said material support frame having a support surface extending from said first end of said material support frame to said second end of said material support frame configured for supporting a surface of an planar material;
   a stop plate, said stop plate being coupled to said first end of said material support frame and extending away from said support surface of said material support frame, said stop plate being configured for supporting an end of the planar material;
   a pair of caster frames, each said caster frame being elongate, each said caster frame being pivotably coupled to a bottom surface of said central frame, each said caster frame being pivotable about an associated vertical caster frame axis of a pair of vertical caster frame axes, each said caster frame being pivotable between a deployed position and a folded position, wherein a central longitudinal axis of each said caster frame is perpendicular to a vertical plane through said central longitudinal axis of said horizontal member when said caster frame is in said deployed position, each said central longitudinal axis of each caster frame being parallel to said central longitudinal axis of said horizontal member when said caster frame is in said folded position,
   wherein a collapsed configuration results when said material support frame is in said vertical orientation and each said caster frame is in said folded position; and
   a plurality of casters, an associated pair of said plurality of casters being pivotably coupled to a bottom surface of each said caster frame, each said caster being pivotable about an associated vertical caster axis, each said vertical caster axis being perpendicular to said central longitudinal axis of said associated caster frame, said plurality of casters being configured for movably positioning said central frame on a transport surface.

2. The device of claim 1, further comprising:
   an orientation locking member, said orientation locking member being coupled to said material support frame opposite said support surface of said material support frame, said orientation locking member having a plurality of orientation holes for locking said material support frame in each of a plurality of orientations, said plurality of orientations including said vertical orientation and said horizontal orientation;
   an orientation bracket, said orientation bracket being coupled to said vertical member of said central frame, a hole of said orientation bracket being positioned such that each said orientation hole of said orientation locking member is positionable coaxially with said hole of said orientation bracket; and
   an orientation locking pin, said orientation locking pin being removably insertable concurrently through said hole of said orientation bracket and each of said orientation holes of said orientation locking member such that said material support frame is secured in an associated orientation.

3. The device of claim 2, wherein said orientation locking pin is mechanically coupled to said orientation bracket, said orientation locking pin being spring biased to insert through said hole of said orientation bracket.

4. The device of claim 1, further comprising:
   a pair of deployment brackets, each said deployment bracket being coupled to said horizontal member of said central frame, wherein each said caster frame has a hole in a top surface of said caster frame, each said hole of each said caster frame being positionable coaxially with a hole of an associated deployment bracket; and
   a pair of deployment locking pins, each said deployment locking pin being removably insertable concurrently through each said hole of each said deployment bracket and said associated hole of said associated caster frame such that said associated caster frame is secured in said deployed position.

5. The device of claim 4, wherein each said deployment locking pin is mechanically coupled to said associated deployment bracket, each said deployment locking pin being spring biased to insert through said associated hole of said associated caster frame.

6. The device of claim 1, wherein said vertical member of said central frame is one of a pair of vertical members, said horizontal member of said central frame extending between said pair of vertical members, each said vertical member extending upward from said horizontal member, said material support frame having a pair of lateral sides extending from said first end of said material support frame to said second end of said material support frame, each said lateral side of said material support frame being pivotably coupled to an associated vertical member proximate a distal end of said associated vertical member relative to said horizontal member, wherein said horizontal adjustment axis extends through a center of gravity of said material support frame and said stop plate.

7. The device of claim 6, wherein each said caster frame is pivotably coupled to said horizontal member proximate an associated end of a pair of ends of said horizontal member, wherein each said caster is positioned proximate an associated end of said associated caster frame.

8. The device of claim 7, wherein:
   said horizontal member of said central frame is constructed of 5.08-centimeter square tubing extending between each said vertical member of said central frame,
   each said vertical member of said central frame is constructed of 5.08-centimeter square tubing extending from said horizontal member of said central frame to an associated distal end of each said vertical member,
   said material support frame is constructed of 5.08-centimeter square tubing extending along each of said first end of said material support frame, said second end of said material support frame, and each of said lateral sides of said material support frame,
   each said caster frame is constructed of 5.08-centimeter square tubing extending between each of said pair of ends of said caster frame.

9. The device of claim 8, further comprising a plurality of carriage bolt assemblies, a first pair of carriage bolt assemblies of said plurality of carriage bolt assemblies pivotably coupling said material support frame to each said vertical member of said central frame, a second pair of carriage bolt assemblies of said plurality of carriage bolt assemblies pivotably coupling said horizontal member of said central frame to each said caster frame, each said carriage bolt assembly comprising an associated carriage bolt, an associated spacer, an associated washer, and an associated lock nut.

10. The device of claim 8, wherein said central frame, said material support frame, said stop plate, and said pair of said caster frames are constructed of steel.

11. The device of claim 1, wherein said stop plate is one of a pair of stop plates, each stop plate being coupled to said first end of said material support frame and extending away from said support surface of said material support frame, each said stop plate being positioned proximate an associated lateral side of said material support frame.

12. The device of claim 11, further comprising a pair of stop plate lips, each said stop plate lip extending from a distal end of an associated one of said stop plates relative to said material support frame parallel to said support surface of said material support frame toward said second end of said material support frame, each said stop plate lip being configured for supporting an end of the planar material.

13. The device of claim 12, wherein said stop plate and said stop plate lip are constructed of steel.

14. The device of claim 1, wherein each said caster comprises a 10.16-centimeter caster wheel, each said caster wheels being constructed of rubber, each said caster wheel being lockable to said associated caster.

15. A foldable transport cart for planar materials comprising:

a central frame, said central frame comprising a horizontal member extending between a pair of vertical members, each said vertical member extending upward from said horizontal member, said horizontal member of said central frame being elongated along a central longitudinal axis of said horizontal member,
   wherein said horizontal member of said central frame is constructed of 5.08-centimeter square tubing extending between each said vertical member of said central frame,
   wherein each said vertical member of said central frame is constructed of 5.08-centimeter square tubing extending from said horizontal member of said central frame to an associated distal end of each said vertical member relative to said horizontal member;
a material support frame, said material support frame being rectangular, said material support frame extending from a first end of said material support frame to a second end of said material support frame, said material support frame having a pair of lateral sides extending from said first end to said second end, each said lateral side of said material support frame being pivotably coupled to an associated vertical member proximate a distal end of said associated vertical member relative to said horizontal member, said material support frame being pivotable about a horizontal adjustment axis between a horizontal orientation and a vertical orientation, said material support frame having a support surface extending from said first end of said material support frame to said second end of said material support frame configured for supporting a surface of an planar material,
   wherein said material support frame is constructed of 5.08-centimeter square tubing extending along each of said first end of said material support frame, said second end of said material support frame, and each of said lateral sides of said material support frame;
a pair of stop plates, each stop plate being coupled to said first end of said material support frame and extending away from said support surface of said material support frame, each said stop plate being positioned proximate an associated lateral side of said material support frame;
a pair of stop plate lips, each said stop plate lip extending from a distal end of an associated one of said stop plates relative to said material support frame parallel to said support surface of said material support frame toward said second end of said material support frame, each said stop plate lip being configured for supporting an end of the planar material, wherein said horizontal adjustment axis extends through a center of gravity of said material support frame, said pair of stop plates, and said pair of stop plate lips;
an orientation locking member, said orientation locking member being coupled to said material support frame opposite said support surface of said material support frame, said orientation locking member having a plurality of orientation holes for locking said material support frame in each of a plurality of orientations, said plurality of orientations including said vertical orientation and said horizontal orientation;
an orientation bracket, said orientation bracket being coupled to said vertical member of said central frame, a hole of said orientation bracket being positioned such that each said orientation hole of said orientation locking member is positionable coaxially with said hole of said orientation bracket;

an orientation locking pin, said orientation locking pin being removably insertable concurrently through said hole of said orientation bracket and each of said orientation holes of said orientation locking member such that said material support frame is secured in an associated orientation, wherein said orientation locking pin is mechanically coupled to said orientation bracket, said orientation locking pin being spring biased to insert through said hole of said orientation bracket;

a pair of caster frames, each said caster frame being elongate, each said caster frame being pivotably coupled to a bottom surface of said central frame, each said caster frame being pivotable about an associated vertical caster frame axis of a pair of vertical caster frame axes, each said caster frame being pivotable between a deployed position and a folded position, wherein said horizontal member of said central frame has a central longitudinal axis of said horizontal member, a central longitudinal axis of each said caster frame being perpendicular to a vertical plane through said central longitudinal axis of said horizontal member when said caster frame is in said deployed position, each said central longitudinal axis of each caster frame being parallel to said central longitudinal axis of said horizontal member when said caster frame is in said folded position, wherein a collapsed configuration results when said material support frame is in said vertical orientation and each said caster frame is in said folded position, wherein each said caster frame is pivotably coupled to said horizontal member proximate an associated end of a pair of ends of said horizontal member, wherein each said caster frame is constructed of 5.08-centimeter square tubing extending between each of said pair of ends of caster frame;

a pair of deployment brackets, each said deployment bracket being coupled to said horizontal member of said central frame, wherein each said caster frame has a hole in a top surface of said caster frame, each said hole of each said caster frame being positionable coaxially with a hole of an associated deployment bracket;

a pair of deployment locking pins, each said deployment locking pin being removably insertable concurrently through each said hole of each said deployment bracket and said associated hole of said associated caster frame such that said associated caster frame is secured in said deployed position, wherein each said deployment locking pin is mechanically coupled to said associated deployment bracket, each said deployment locking pin being spring biased to insert through said associated hole of said associated caster frame;

a plurality of casters, an associated pair of said plurality of casters being pivotably coupled to a bottom surface of each said caster frame, wherein each said caster is positioned proximate an associated end of said associated caster frame, each said caster being pivotable about an associated vertical caster axis, each said vertical caster axis being perpendicular to said central longitudinal axis of said associated caster frame, said plurality of casters being configured for movably positioning said central frame on a transport surface, wherein each said caster comprises a 10.16-centimeter caster wheel, each said caster wheels being constructed of rubber, each said caster wheel being lockable to said associated caster; and a plurality of carriage bolt assemblies, a first pair of carriage bolt assemblies of said plurality of carriage bolt assemblies pivotably coupling said material support frame to each said vertical member of said central frame, a second pair of carriage bolt assemblies of said plurality of carriage bolt assemblies pivotably coupling said horizontal member of said central frame to each said caster frame, each said carriage bolt assembly comprising an associated carriage bolt, an associated spacer, an associated washer, and an associated lock nut.

* * * * *